United States Patent [19]

Scholl

[11] Patent Number: 5,528,498
[45] Date of Patent: Jun. 18, 1996

[54] LASER REFERENCED SWING SENSOR

[75] Inventor: Rolland D. Scholl, Dunlap, Ill.

[73] Assignee: Caterpillar Inc., Peoria, Ill.

[21] Appl. No.: 262,722

[22] Filed: Jun. 20, 1994

[51] Int. Cl.$^6$ ...................................................... E02F 9/26
[52] U.S. Cl. ........................ 364/424.07; 364/434; 37/419
[58] Field of Search ............................... 364/424.07, 434;
250/216, 227.28, 208.2; 299/1; 175/24;
73/432 HA; 37/103, 348, 419; 356/138

[56] References Cited

U.S. PATENT DOCUMENTS

| | | | |
|---|---|---|---|
| 3,137,794 | 6/1964 | Seward | 250/216 |
| 3,997,071 | 12/1976 | Teach | 214/761 |
| 4,129,224 | 12/1978 | Teach | 214/763 |
| 4,231,700 | 11/1980 | Studebaker | 414/700 |
| 4,367,898 | 1/1983 | Oven et al. | 299/1 |
| 4,393,606 | 7/1983 | Warnecke | 37/103 |
| 4,403,664 | 9/1983 | Sullinger | 175/24 |
| 4,452,078 | 6/1984 | Formanek et al. | 73/432 HA |
| 4,733,355 | 3/1988 | Davidson et al. | 364/424 |
| 4,805,086 | 2/1989 | Nielsen et al. | 364/167.01 |
| 4,807,131 | 2/1989 | Clegg | 364/424.01 |
| 4,820,041 | 4/1989 | Davidson et al. | 356/1 |
| 4,829,418 | 5/1989 | Nielsen et al. | 364/167.01 |
| 4,866,641 | 9/1989 | Nielsen et al. | 364/559 |
| 4,884,939 | 12/1989 | Nielsen | 414/698 |
| 4,888,890 | 12/1989 | Studebaker et al. | 37/103 |
| 4,945,221 | 7/1990 | Nielsen et al. | 250/203.1 |
| 4,948,967 | 8/1990 | Naito et al. | 250/227.28 |
| 5,142,658 | 8/1992 | McMorran et al. | 382/1 |
| 5,170,350 | 12/1992 | Kamimura et al. | 364/424.02 |
| 5,189,484 | 2/1993 | Koschmann et al. | 356/138 |
| 5,343,033 | 8/1994 | Cain | 250/208.2 |
| 5,404,661 | 4/1995 | Sahm et al. | 37/348 |

OTHER PUBLICATIONS

Article entitled "Laserplane 1145 Dual Slope Transmitter" by Laserplane, Inc. (Copyright 1991).
Fraunhofer–Institution, vol. 1 Article entitled "Automation and Robotics in Construction" (Published Approximately Jun. 1991).

Primary Examiner—Kevin J. Teska
Assistant Examiner—Russell W. Frejd
Attorney, Agent, or Firm—Steven R. Janda; Thomas J. Bluth; James R. Yee

[57] ABSTRACT

An apparatus is provided for controlling a machine having a rotatable body and includes a light signal source, a sensor connected to the rotatable body for producing electrical signals in response to receiving the light signal, and a device controlling the rotational speed of the rotatable body in response the electrical signals.

11 Claims, 5 Drawing Sheets

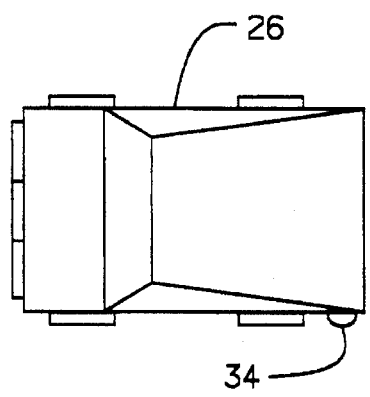
Fig_1a_
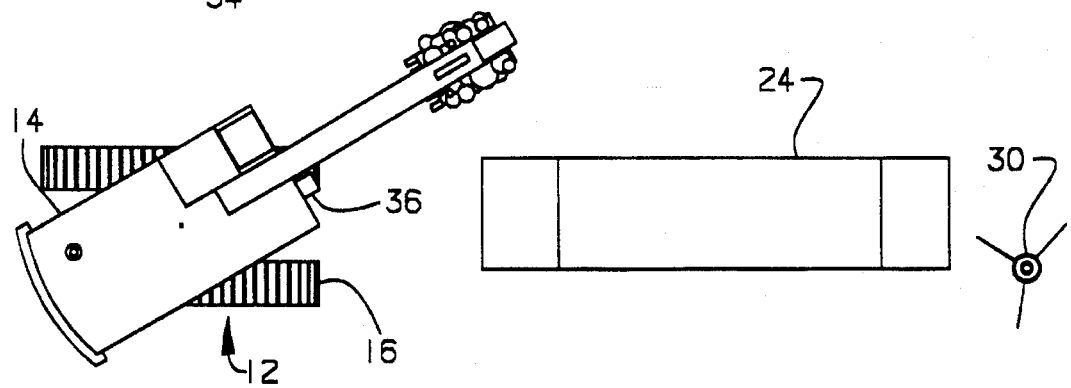
Fig_1b_
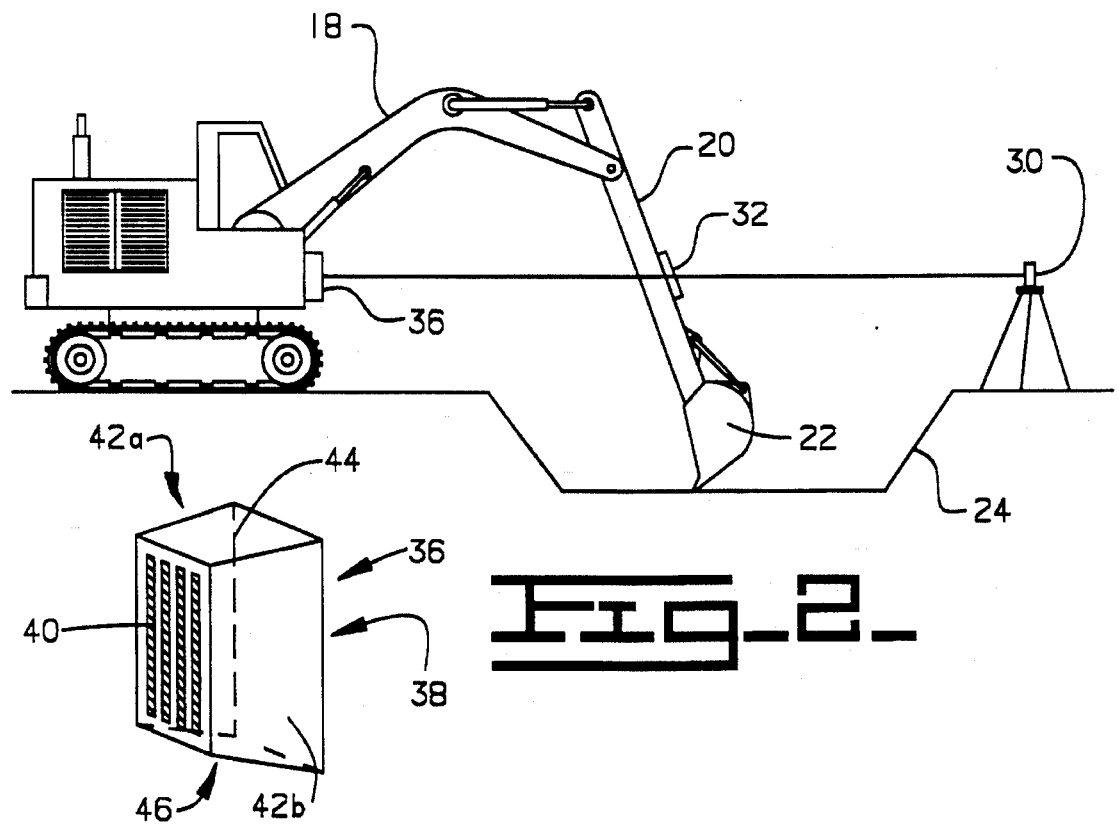
Fig_2_

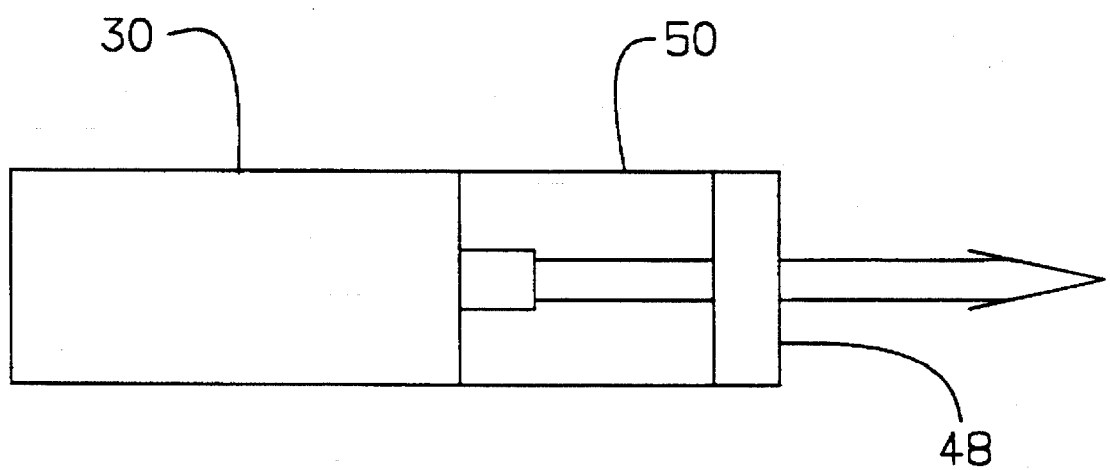
Fig_3a_
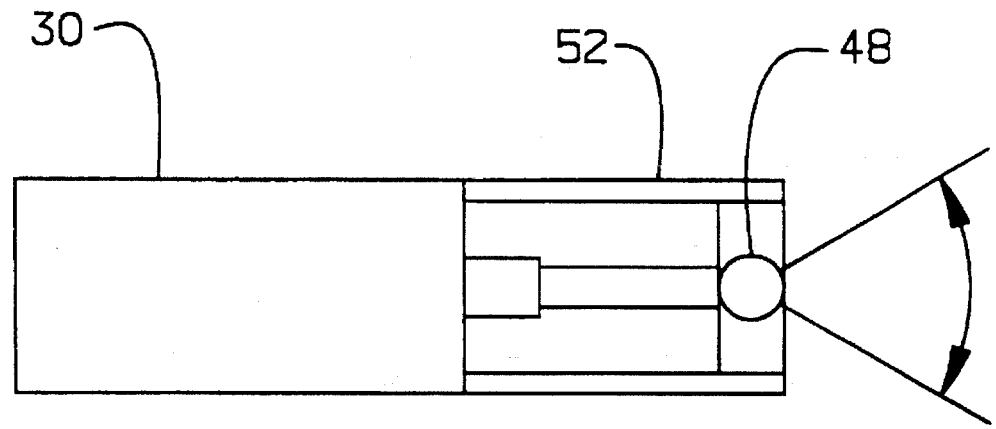
Fig_3b_

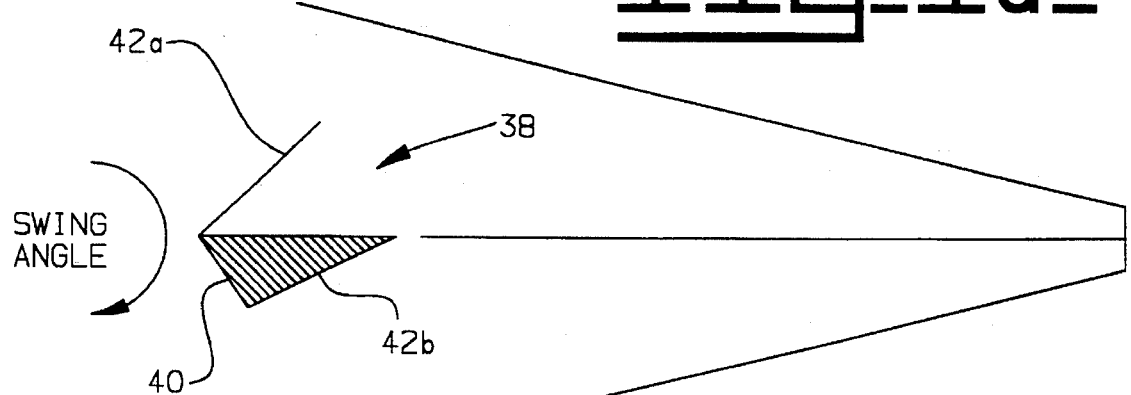
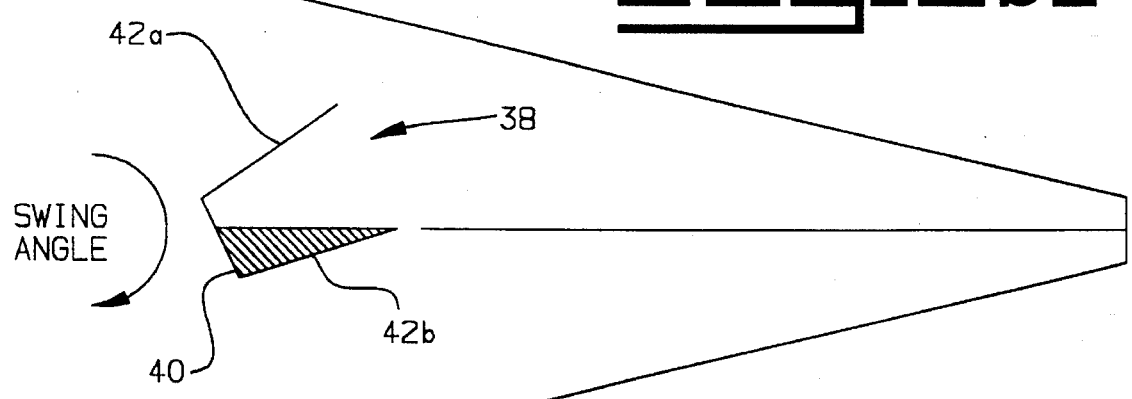
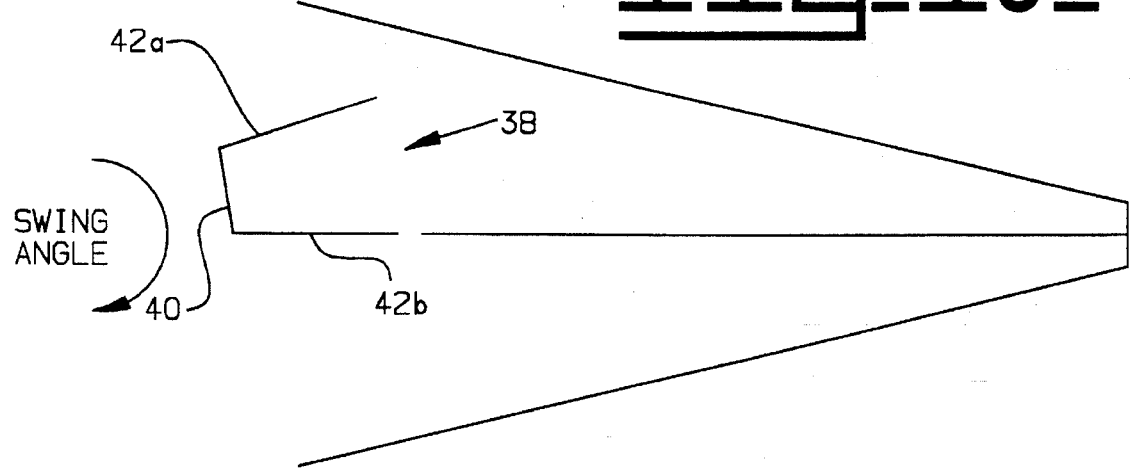

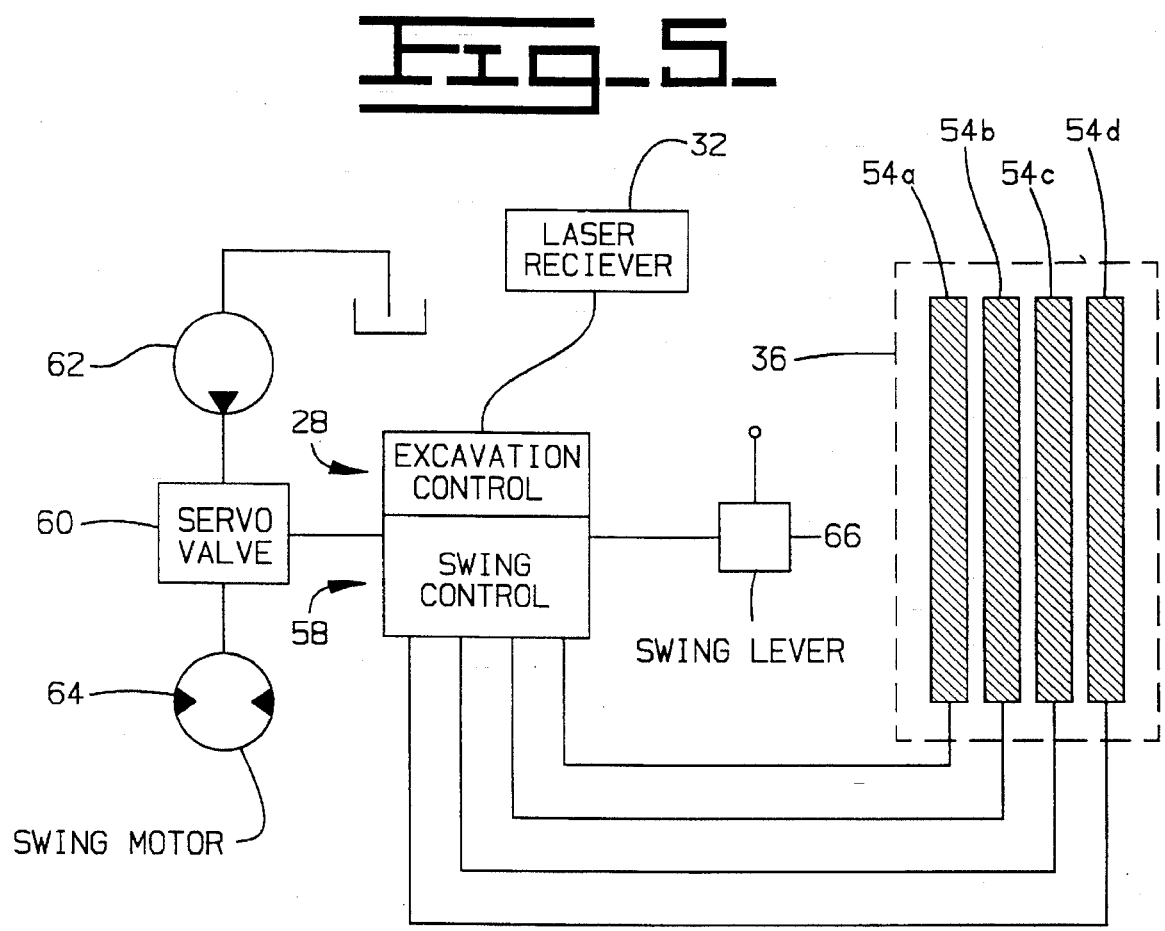

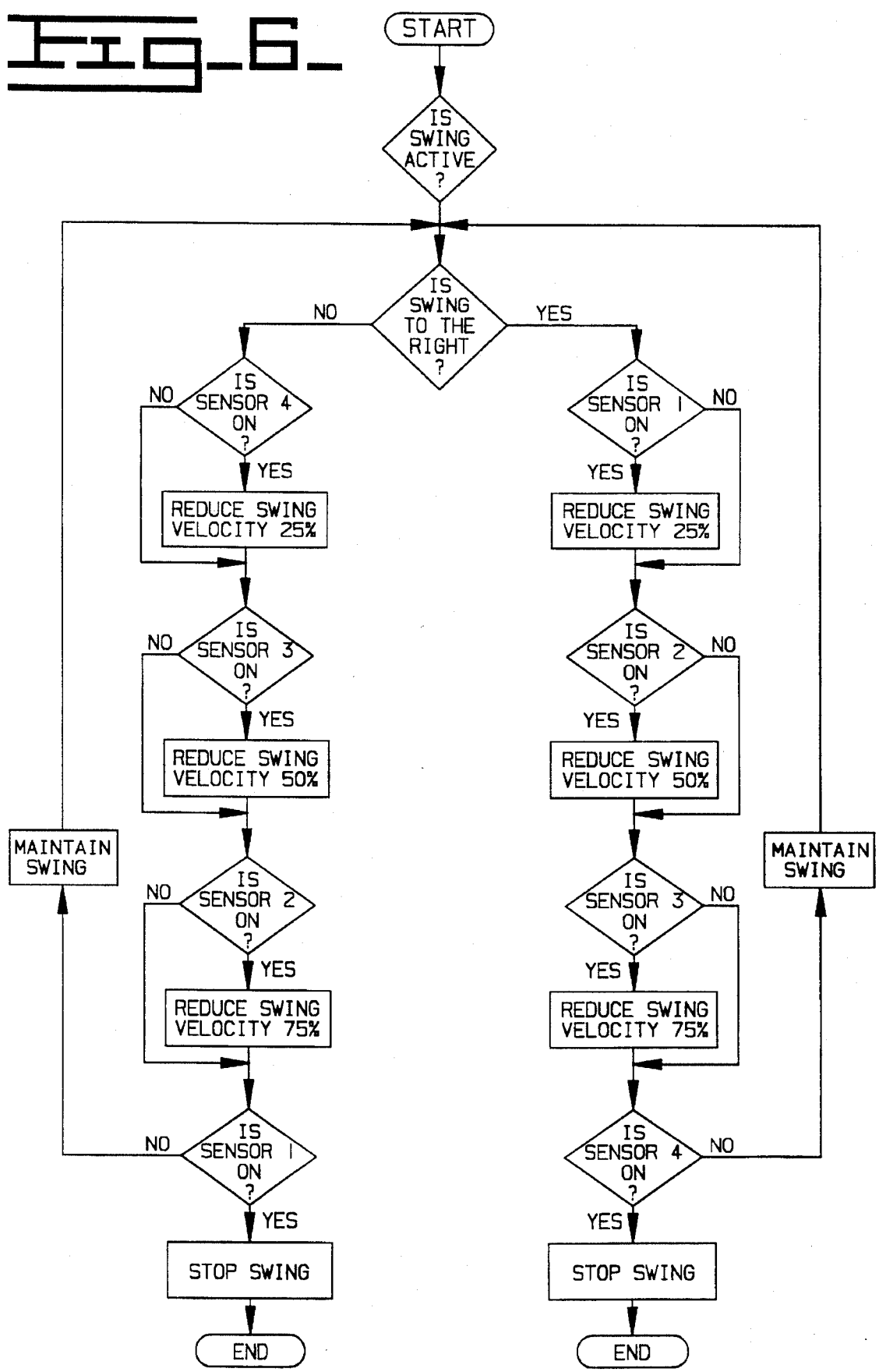
Fig_6_

LASER REFERENCED SWING SENSOR

TECHNICAL FIELD

The invention relates generally to control of machines having a rotatable body, and more particularly, to a sensor for controlling rotation in response to a reference laser.

BACKGROUND ART

Many work machines, particularly those used in construction and mining, require extensive operator skill to ensure efficient operation. Because such skilled operators are often in short supply, efforts continue to automate portions of the work cycle of such machines to improve the efficiency of lesser skilled operators and to reduce fatigue for skilled operators.

For example, electronic controls have been developed to aid operators of hydraulic excavators in digging trenches that are level or that follow a predetermined slope. Examples of systems of this type are disclosed in U.S. Pat. Nos. 4,805,086, 4,231,700, and 4,129,224.

Once an operator has filled the bucket on a hydraulic excavator, either entirely manually or with the aid of an electronic control, he must then manipulate the controls to move the bucket to a dump position. In many instances, the excavated material is to be loaded into a truck for removal from the work site. In this case, the operator must position the bucket over the truck's hauling portion. After the bucket is dumped, the operator then manipulates the controls to move the bucket back to a dig position to restart the work cycle.

To further aid machine operators, it would be advantageous to automate the dump and return to dig portions of the work cycle. One difficulty in automating these functions, however, is the lack of a reference signal to indicate where the rotatable body should be rotated for dumping the load or returning to the dig location. The problem of rotating to a dump location is exacerbated when loading trucks that may move during loading or that do not always stop in the same location each time they return to be filled.

The present invention is directed to overcoming one or more of the problems set forth above.

DISCLOSURE OF THE INVENTION

In one aspect of the invention, an apparatus is provided for controlling a machine having a rotatable body and includes a light signal source, a sensor connected to the rotatable body for producing electrical signals in response to receiving the light signal, and a device controlling the rotational speed of the rotatable body in response the electrical signals.

In a second aspect of the invention, a method is provided for controlling a machine having a rotatable body and includes the steps of directing a light signal to a reflector located off-board the machine, producing an electrical signal in response to a sensor receiving the reflected light signal, and controlling the rotation of the rotatable body in response to the electrical signal.

The invention also includes other features and advantages that will become apparent from a more detailed study of the drawings and specification.

BRIEF DESCRIPTION OF THE DRAWINGS

For a better understanding of the invention, reference may be made to the accompanying drawings, in which:

FIGS. 1a and 1b illustrate a hydraulic excavator operating in connection with the subject invention;

FIG. 2 illustrates a partial enclosure;

FIGS. 3a and 3b illustrate a cylinder located in the path of a light beam to produce a fan of light in one plane;

FIGS. 4a, 4b, and 4c show the extent of shading in the partial enclosure as it progressively rotates toward a light source;

FIG. 5 is a diagrammatic illustration of a portion of an embodiment of the invention; and FIG. 6 illustrates a flow chart of an algorithm used in connection with an embodiment of the invention.

BEST MODE FOR CARRYING OUT THE INVENTION

An apparatus for controlling a rotatable portion 14 of a work machine 12 is referred to generally by the number 10. In the embodiment shown in FIGS. 1a and 1b, the work machine 12 is a hydraulic excavator and the rotatable body 14 is a rotating car body capable of rotating through three-hundred-sixty degrees with respect to the undercarriage 16. The rotatable body 14 on the hydraulic excavator includes a hydraulically actuated boom 18, stick 20, and bucket 22 for use in excavating soil and other materials. As shown, the hydraulic excavator is excavating a trench 24 and loading the excavated material into a truck 26.

In the preferred embodiment, the work machine 12 includes an excavation control 28 for controlling the geometry, e.g. depth and slope, of an excavation with respect to a reference plane. A light signal produced by a rotating laser 30, such as that available from Spectra-Physics Laserplane, Inc. in Dayton, Ohio under the designation Laserplane 1145, is used to establish the reference plane. Such systems are well-known in the art and are exemplified by the systems disclosed in U.S. Pat. Nos. 4,085,086 and 4,231,700, both of which include a laser receiver 32 connected to the stick 20 that produces electrical signals in response to receiving the light signal. The electrical signals from the laser receiver 32 are used by the excavation control 28 to determine the position of the digging implement with respect to the reference plane. With this information, the excavation control 28 produces signals for operation of one or more of the boom 18, stick 20, and bucket 22 to assist the operator in maintaining a constant depth or slope to the excavation.

A reflector 34 is advantageously connected to the truck 26 and positioned such that when the truck 26 moves into position to be loaded, the light signal from the rotating laser 30 is reflected toward the hydraulic excavator 12. Thus during each rotation of the rotating laser 30, the light signal is directed toward the hydraulic excavator 12 from both the rotating laser 30 itself, and also from the reflector 34 mounted on the truck 26. The reflector 34 is made of any highly reflective material and is advantageously slightly curved such that the fan shaped light signal is also reflected from the reflector 34 in a fan shape. The reflector is also of sufficient height that, as the suspension of the truck 26 is compressed, a portion of the reflector 34 will remain at the same elevation as the light signal. Thus one suitable shape for the reflector is a portion of a cylinder of sufficient height to account for the truck being at slightly different elevations from the rotating laser 30 and for compression of the suspension during loading.

As shown in FIG. 2, a detector 36 includes a partial enclosure having at least one open side 38 opposite a sensor panel 40 and at least two side panels 42a,42b extending between the sensor panel 40 and the open side 38. The sensor panel includes one or more photosensitive sensors as described in more detail below. Advantageously, the two side panels 42a,42b are substantially vertical and angle slightly outwardly from an imaginary plane normal to the plane formed by the sensor panel 40. In the preferred embodiment, top and bottom panels 44,46 are also included to reduce the amount of ambient light reaching the sensor panel 40. The height of the detector 36 is selected to provide a range of elevations at which the light signal can be with respect to the hydraulic excavator while still intersecting a portion of the detector 36 and the sensors connected to the sensor panel 40.

In one embodiment, the light beam produced by the rotating laser 30 is used as the light signal; however, the preferred embodiment includes a means for producing a fan-shaped light signal from the light beam produced by the rotating laser. Turning to FIGS. 3a and 3b, a cylindrically shaped portion of optically transmissive material 48 is placed in front of the light beam 50 being produced by the rotating laser 30. This effectively causes the light signal to fan out in a plane normal to the axis of the cylinder 48. Preferably, the radius of the cylinder 48 is larger than the radius of the light beam produced by the rotating laser 30. The cylinder 48 is held in the path of the light beam 50 as the laser rotates by a bracket or support mechanism 52. Advantageously, the cylinder 48 is mounted such that its axis is normal to the plane of rotation of the rotating laser 30.

The operation of the detector 36 in connection with a rotating body 14 and a fan-shaped light signal is illustrated in FIGS. 4a–4c. Assume first that the open side 38 of the detector 36 is facing away from the origin or reflection of the light signal. As the detector 36 is rotated toward the origin or reflection, the light signal will eventually begin to reach a small portion of the sensor panel 40 while the majority of the sensor panel 40 remains shaded as shown in FIG. 3a. As the detector 36 continues to rotate toward the source or reflection, less of the sensor panel 40 is shaded from the light signal until finally the detector 36 reaches the position in FIG. 3c in which substantially all of the sensor panel 40 is able to receive light from the source or reflection of the light signal.

The length of the two side panels 42a,42b and the degree to which they radiate outwardly from the imaginary plane normal to the sensor panel 40 are selected in response to the desired response of the detector 36 and the range of swing in which control is desired. As will be better understood from a study of FIGS. 4a–4c, the longer the side panels 42a,42b, the smaller the range of angular rotation between a point in which the entire sensor panel is shaded from the incoming light signal to a point in which none of the sensor panel 40 is shaded. Similarly, the more the side panels 42a,42b radiate outwardly, the larger the range of angular rotation between complete shading and no shading of the sensor panel 40.

Turning now to FIG. 5, the detector 36 is shown to include strips 54a,54b,54c,54d of photoelectric material affixed to the sensor panel 40 and electrically connected to a swing control 58. The number and widths of the strips of photoelectric material are selected in response to the desired degree of precision in the control. In the preferred embodiment, the photoelectric material produces a voltage signal above a predetermined threshold, logic "1", when it receives the light signal and produces a logic "0" signal otherwise. It should be understood by those skilled in the art, however, that a single sensor formed of photoelectric material could be placed on the sensor panel 40 to produce an analog signal having a level being dependent upon the amount of the sensor panel 40 exposed to the light signal. Combinations of these two approaches are also possible.

Alternatively, bands of photo receptors or cells can be arranged similar to the strips of photoelectric material 54a, 54b,54c,54d. In this embodiment, the photo receptors or cells in each band are electrically connected in parallel and when one of the photo receptors or cells is illuminated by the light signal, the impedance across that cell, and thus the parallel circuit, is reduced. The impedance drop caused by the light signal intersecting the band of photoreceptors or cells is used to produce an electrical signal indicating the event which is delivered to the swing control 58.

Advantageously, the swing control 58 and the excavation control 28 for controlling the geometry of the excavation are included in a microprocessor. The swing control 58 is adapted to deliver control signals to a servo actuated hydraulic valve 60 of a type well-known in the art such as a voice coil or a proportional pilot pressure valve. The servo valve 60 serves to control the flow of pressurized hydraulic fluid between a hydraulic pump 62 and a hydraulic swing motor 64 used to rotate the car body on a hydraulic excavator. The swing control 58 is also connected to a swing lever 66 located in the operator compartment. The swing lever 66 produces an electrical signal indicative of the direction and rate of swing of the car body desired by the operator. The swing control 58 in turn delivers a signal to the servo valve 60 to cause the car body to rotate in the desired manner. The type of swing lever 66 used is a matter of design choice and may be, for example, of the type producing a pulse width modulated signal in response to the direction and degree of lever displacement.

Turning now to FIG. 6, a flow chart of an algorithm performed by the swing control 58 is illustrated. In response to a signal being received from the swing lever 66 beyond a predetermined threshold, the swing control 58 determines that the swing is active. In the preferred embodiment, the predetermined threshold is the maximum deflection, thus this portion of the swing control 58 is only active when the operator is trying to swing the car body at the maximum speed. An alternative embodiment includes left and right push-buttons on the swing lever 66 to be operated by the operator's thumb when he desires to swing the car body to the next stopping point in either the left or right directions, respectively, at the fastest speed possible while keeping the machine operating smoothly and within its design limits. In still another embodiment, the predetermined threshold corresponds to only a slight displacement of the swing lever 58 such that this portion of the swing control is active whenever the operator swings the car body.

If the swing is active and to the right, control proceeds down the righthand branch of the flow chart, otherwise if swing is active, control proceeds down the lefthand branch. In the preferred embodiment, four strips 54a,54b,54c,54d of photosensitive material producing logic "1" or logic "0" signals in response to the light signal are included and are arbitrarily numbered from one to four for purposes of explanation. If swinging to the right and sensor one 54d is logic "1", the swing control 58 reduces the swing velocity by twenty-five percent by closing the servo valve 60 the proper amount. If sensor two 54c is logic "1", the swing control reduces the swing velocity by fifty percent by closing the servo valve further. If sensor three 54*b* is logic "1", swing velocity is reduced by seventy-five percent, and if sensor four 54*a* is logic "1", then the swing control 58 closes the servo valve 60 to stop the car body from swinging. If none of the sensors are producing a logic "1" signal, then the swing control 58 continues to send a signal to the servo valve 60 causing the car body to continue swinging in the desired direction and at the desired velocity.

If swinging to the left and sensor one 54*a* is logic "1", the swing control 58 reduces the swing velocity by twenty-five percent by closing the servo valve 60 the proper amount. If sensor two 54*b* is logic "1", the swing control reduces the swing velocity by fifty percent by closing the servo valve further. If sensor three 54*c* is logic "1", swing velocity is reduced by seventy-five percent, and if sensor four 54*d* is logic "1", then the swing control 58 closes the servo valve 60 to stop the car body from swinging.

While the invention has been disclosed in connection with four strips of photosensitive material and reducing the rotational speed of the car body an equal amount in response to each strip being unshaded, it should be understood that more or fewer sensors can be used and other control schemes can be applied without deviating from the invention.

Advantageously, the reflector 34 is mounted on the truck in a location such that when all four of the sensors 54*a*,54*b*, 54*c*,54*d* are illuminated by the reflected light signal, the car body of the hydraulic excavator is positioned properly for dumping a load into the dump body of the truck 26. Similarly, the rotating laser is advantageously located in a position such that the car body of the excavator is in the proper position to return to digging when all four of the sensors 54*a*,54*b*,54*c*,54*d* are illuminated by the light emanating directly from the rotating laser.

The detector 36 is preferably located on the front of the car body alongside the boom 18 and in a position such that the light signal will not be obstructed from reaching the detector 36 by the boom 18, stick 20, or bucket 22 during normal operation. The detector is located at an elevation at which at least a portion of the sensor strips 54*a*,54*b*,54*c*,54*d* intersects the plane defined by the light signal during most operations.

While the invention has been disclosed in connection with an electronic excavation control 28 responsive to a laser beam, it is obvious to those skilled in the art that the embodiments of the present invention are also useful in connection with devices providing visual indications of the position of a digging implement in response to a laser. Such a system using a laser to provide a visual indication of the digging implement position is disclosed in U.S. Pat. No. 4,393,606.

INDUSTRIAL APPLICABILITY

In operation, the present invention is used on a work machine having a rotatable body, such as a hydraulic excavator, front shovel, or crane. The detector produces electrical signals in response to receiving laser light. The detector is arranged such that the laser light is received only when the detector is within a predetermined range of angles with respect to the light source or the reflector.

As the detector rotates toward the light source or reflector, it first begins to see the laser when the detector is at some predetermined angular displacement from the central direction of incoming laser light as shown in FIG. 3*a*. As rotation continues, more and more of the sensor sees the fan of light. In the preferred embodiment, a plurality of vertical strips of light sensitive material, e.g. photocells or strips of photovoltaic material, produce digital signals indicative of the amount of area in the partial enclosure that is shaded. Alternatively, the invention could be built in an analog version in which an electrical signal proportional to the amount of shading in the partial enclosure would be produced by photosensitive material located in the partial enclosure.

The machine having the rotatable body includes an electronic swing control 58 for controlling the direction and rate of swing. The output of the detector 36 is delivered to the swing control 58 and the swing velocity is slowed as progressively more light is received by the detector 36.

In one embodiment, the machine is excavating material and loading a truck 26. The reflector 34 is located on the truck 26 such that the light signal is reflected from the truck towards the machine and the electrical signals are produced as the rotatable body nears a position at which the material should be dumped into the truck 26. Thus, even though the truck may move slightly or may not always return to the same precise location, the rotatable body will rotate to the proper location for loading the truck.

Other aspects, objects, and advantages of this invention can be obtained from a study of the drawings, the disclosure, and the appended claims.

I claim:

1. An apparatus for controlling an excavating machine having a rotatable body including boom, stick and bucket linkages, the rotatable body is rotatable to a first position, comprising:

a reference means for producing a light signal, a reflector located off-board the excavating machine, said reference means directing said light signal to said reflector;

a detector connected to the rotatable body for producing an electrical signal in response to receiving said light signal from said reflector, the reflector and detector being positioned such that the detector receives said light signal when the rotatable body is in the first position; and means for controlling the rotation of the rotatable body with respect to the excavating machine in response to said electrical signal.

2. An apparatus, as set forth in claim 1, wherein said reflector is rounded.

3. An apparatus, as set forth in claim 1, wherein said reflector is connected to a mobile hauling unit.

4. An apparatus, as set forth in claim 1, wherein the rotatable body is rotatable to a second position and said reference means and detector are positioned such that the detector receives said light signal when the rotatable body is in the second position.

5. An apparatus, as set forth in claim 1, including means for surrounding said detector whereby said light signal reaches said detector when the rotatable body is disposed in a limited angular range with respect to the excavating machine.

6. An apparatus, as set forth in claim 1, wherein the excavating machine is a hydraulic excavator and includes an excavation control means for controlling the geometry of the excavation with respect to a reference plane; said light signal establishing the reference plane for controlling the geometry of the excavation.

7. An apparatus, as set forth in claim 1, wherein the excavating machine is a hydraulic excavator and includes a depth indicating means for providing an indication of the depth of the excavation with respect to a reference plane; said light signal establishing the reference plane for controlling the geometry of the excavation.

8. A method for controlling an excavating machine having a rotatable body including boom, stick, and bucket linkages, the rotatable body is rotatable to a first position, comprising the steps of:

directing a laser light signal to a reflector located offboard the machine;

producing an electrical signal in response to a detector receiving the reflected laser light signal from the reflector, said detector being located on the earthmoving machine; and controlling the rotation of the rotatable body in response to the electrical signal including the step of stopping rotation when the rotatable body is in the first position.

9. An apparatus, as set forth in claim 8, wherein said reflector is connected to a mobile hauling unit.

10. A method, as set forth in claim 8, wherein the rotatable body is rotatable to a second position and said step of controlling the rotation of the rotatable body includes the step of stopping rotation when the rotatable body is in the second position.

11. A method, as set forth in claim 8, wherein the excavating machine is a hydraulic excavator and including the step of controlling the geometry of an excavation in response to a reference plane established by the light signal.

* * * * *